(12) United States Patent
Walker et al.

(10) Patent No.: US 9,400,056 B2
(45) Date of Patent: Jul. 26, 2016

(54) APPARATUS FOR DEPOSITING

(75) Inventors: John Howard Walker, York (GB); John Michael Leadbeater, York (GB); Jonathan Sutton, York (GB)

(73) Assignee: Nestec S.A., Vevey (CH)

( * ) Notice: Subject to any disclaimer, the term of this patent is extended or adjusted under 35 U.S.C. 154(b) by 485 days.

(21) Appl. No.: 13/255,364

(22) PCT Filed: Feb. 24, 2010

(86) PCT No.: PCT/EP2010/001121
§ 371 (c)(1),
(2), (4) Date: Nov. 2, 2011

(87) PCT Pub. No.: WO2010/102716
PCT Pub. Date: Sep. 16, 2010

(65) Prior Publication Data
US 2012/0160160 A1 Jun. 28, 2012

(30) Foreign Application Priority Data
Mar. 13, 2009 (GB) .................................. 0904393.6

(51) Int. Cl.
*A23G 3/02* (2006.01)
*F16K 1/08* (2006.01)
(Continued)

(52) U.S. Cl.
CPC ................ *F16K 1/08* (2013.01); *A23G 1/0066* (2013.01); *A23G 1/206* (2013.01); *A23G 3/0027* (2013.01);
(Continued)

(58) Field of Classification Search
CPC .......... A21C 5/006; A21C 9/08; A21C 11/16; A23G 3/02; A23G 3/0236; A23G 3/0252; A23G 3/0257; A23G 3/20; A23G 3/0223; A23G 3/203; A23G 1/205; A23G 1/206; A23G 1/0066; A23G 3/0027; B05C 5/02; B05C 5/0225; F16K 1/04; F16K 1/08

USPC .......... 425/145, 146, 380, 381, 382 R, 382.4, 425/461, 463, 464, 466, 467, 256, 288, 560, 425/562, 563, 569
See application file for complete search history.

(56) References Cited

U.S. PATENT DOCUMENTS 1,346,270 A * 7/1920 Smith .......................... 222/330
1,484,179 A * 2/1924 McClure et al. ................ 99/354
(Continued)

FOREIGN PATENT DOCUMENTS

| CH | 485420 | 2/1970 |
|---|---|---|
| DE | 1193692 | 5/1965 |

(Continued)

OTHER PUBLICATIONS

PCT International Search Report for Application No. PCT/EP2010/001121—Mailing Date of Oct. 20, 2010—4 Pages.

*Primary Examiner* — Seyed Masoud Malekzadeh
(74) *Attorney, Agent, or Firm* — K&L Gates LLP

(57) ABSTRACT

An apparatus for depositing a liquid, semi-liquid or semi-solid food product. The apparatus comprises a fixed volume chamber for receiving the food product under a positive pressure, the chamber being defined by chamber walls, one of the chamber walls being provided with an outlet orifice for depositing the food product, the outlet orifice being provided with a first sealing surface. The apparatus also comprises a valve spindle arranged for reciprocating movement within the chamber, the length direction of the valve spindle extending substantially perpendicular to the chamber wall in which the outlet orifice is provided, a first end of the valve spindle being provided with a second sealing surface. The second sealing surface of the valve spindle is arranged for abutting the first sealing surface of the outlet orifice to thereby close the outlet orifice.

25 Claims, 1 Drawing Sheet

(51) Int. Cl.
  A23G 1/00 (2006.01)
  A23G 3/34 (2006.01)
  B05C 5/02 (2006.01)
  *A21C 5/00* (2006.01)
  *A23G 3/20* (2006.01)
  *A21C 11/16* (2006.01)
  *A23G 1/20* (2006.01)
  *A21C 9/08* (2006.01)
  *F16K 1/04* (2006.01)

(52) U.S. Cl.
  CPC .............. *A23G 3/0257* (2013.01); *A23G 3/203* (2013.01); *B05C 5/0225* (2013.01); *A21C 5/006* (2013.01); *A21C 9/08* (2013.01); *A21C 11/16* (2013.01); *A23G 1/205* (2013.01); *A23G 3/0236* (2013.01); *A23G 3/0252* (2013.01); *A23G 3/20* (2013.01); *A23G 3/2023* (2013.01); *F16K 1/04* (2013.01)

(56) References Cited

U.S. PATENT DOCUMENTS

| | | | | |
|---|---|---|---|---|
| 1,854,148 A * | 4/1932 | Hunter | ......................... | 425/288 |
| 2,246,758 A * | 6/1941 | Roth | ............................ | 425/288 |
| 2,998,963 A * | 9/1961 | Rinderle | ..................... | 366/76.6 |
| 3,037,674 A * | 6/1962 | Brady et al. | .................. | 222/319 |
| 3,178,073 A * | 4/1965 | Cowley | ......................... | 222/267 |
| 3,218,672 A * | 11/1965 | Langecker | .................... | 425/381 |
| 3,281,896 A * | 11/1966 | William et al. | ................ | 425/466 |
| 3,611,493 A * | 10/1971 | Fogelberg et al. | ............. | 425/466 |
| 3,918,687 A * | 11/1975 | Hubers et al. | ................ | 366/139 |
| 4,004,716 A * | 1/1977 | Steels | ........................... | 222/135 |
| 4,089,438 A * | 5/1978 | Steels | ......................... | 222/146.6 |
| 4,338,071 A * | 7/1982 | Daubenbuchel et al. | ..... | 425/140 |
| 4,563,147 A * | 1/1986 | Langecker | ................. | 425/382.4 |
| 5,435,964 A * | 7/1995 | Kagitani et al. | ................ | 264/514 |
| 5,622,732 A * | 4/1997 | Beckwith | ....................... | 425/466 |
| 5,794,820 A * | 8/1998 | Shabbits et al. | ............... | 222/307 |
| 6,223,949 B1* | 5/2001 | Spencer et al. | ................ | 222/140 |
| 6,536,683 B1* | 3/2003 | Filicicchia et al. | ........... | 239/124 |
| 6,773,249 B1* | 8/2004 | Przytulla et al. | ............... | 425/141 |
| 7,001,547 B2* | 2/2006 | Rasmussen | ..................... | 264/40.7 |
| 7,278,844 B2* | 10/2007 | Koetke et al. | .................. | 425/141 |
| 7,476,094 B2* | 1/2009 | Hanot | ............................. | 425/132 |
| 8,585,393 B2* | 11/2013 | Ouriev et al. | ................... | 425/449 |
| 2005/0198921 A1 | 9/2005 | Clusserath | | |
| 2010/0291269 A1* | 11/2010 | Ouriev | ........................... | 426/231 |

FOREIGN PATENT DOCUMENTS

| | | | |
|---|---|---|---|
| DE | 3417062 | 11/1985 | |
| DE | 9000770 | 3/1990 | |
| EP | 1615003 | 1/2006 | |
| FR | 2683161 A1 * | 5/1993 | .............. A23C 13/00 |
| GB | 227609 * | 1/1925 | .............. A23G 3/02 |
| GB | 298340 * | 5/1928 | .............. A23G 3/02 |
| GB | 625196 * | 6/1949 | .............. A23G 3/02 |
| GB | 2060084 | 4/1981 | |

\* cited by examiner

APPARATUS FOR DEPOSITING

FIELD OF THE INVENTION

This invention relates to an apparatus for depositing a liquid, semi-liquid or semi-solid food product. More particularly, but not exclusively, the invention relates to such an apparatus for use in filling mould cavities for finished confectionery products.

The invention also relates to a method for depositing a liquid, semi-liquid or semi-solid food product.

BACKGROUND TO THE INVENTION

It is known to deposit liquid, semi-liquid or semi-solid food products in confectionery manufacturing processes. Such products may, for example, be deposited into a mould cavity for producing a finished confectionery product. One example of such a process is the depositing of liquid chocolate into a mould cavity for the production of a chocolate bar. Fillings for confectionery products, such as fondants, caramels, mousses or truffles, may also be deposited.

In known confectionery manufacturing processes, liquid, semi-liquid or semi-solid food products are deposited by piston-type depositors. A piston type depositor comprises a chamber to which the food product is supplied in liquid, semi-liquid or semi-solid form. The chamber is provided with an outlet orifice through which the food product is deposited and a piston which is moved through the chamber to force the food product through the outlet orifice.

A problem associated with piston-type depositors is that arrays of such depositors, which may be required for the rapid and even filling of mould cavities or the rapid deposition of a continuous layer of the food product, are structurally complicated and expensive to produce and commission. A further problem associated with piston-type depositors is that it can be difficult to accurately control the flow of the food product through the outlet orifice, particularly when the food product is a liquid having a low viscosity.

Piston-type depositors in which the outlet orifice is provided with a pressure operated valve are known. Such depositors provide a more controllable flow of the food product. However, there remains a need for a depositor which exhibits acceptable function with reduced structural complexity.

SUMMARY OF THE INVENTION

According to a first aspect of the invention, there is provided an apparatus for depositing a liquid, semi-liquid or semi-solid food product, the apparatus comprising:
  a fixed volume chamber for receiving the food product under a positive pressure, the chamber being defined by chamber walls, one of the chamber walls being provided with an outlet orifice for depositing the food product, the outlet orifice being provided with a first sealing surface; and
  a valve spindle arranged for reciprocating movement within the chamber, the length direction of the valve spindle extending substantially perpendicular to the chamber wall in which the outlet orifice is provided, a first end of the valve spindle being provided with a second sealing surface;
  wherein the second sealing surface of the valve spindle is arranged for abutting the first sealing surface of the outlet orifice to thereby close the outlet orifice.

The invention thus provides a depositor which is capable of positive operation in the sense that the outlet orifice can be opened and closed to accurately control the flow of the food product. Furthermore, the essential features of the invention described above allow for reduced structural complexity as compared to known depositors, such as piston-type depositors. As a consequence, the apparatus may be manoeuvred at a high speed to deposit the food product in a desired arrangement.

By providing the outlet orifice in a wall of the chamber, and by arranging the valve spindle to extend substantially perpendicular to the chamber wall, an arrangement is results which, in use, does not exhibit a significant pressure drop during deposition of the food product.

The apparatus is suitable for depositing, among other food products, chocolate, including aerated chocolate, as well as fondants, caramels, mousses and truffles. The apparatus is particularly suitable for depositing aerated food products, since allowances can be made for the effects of the constant pressure environment on the food product.

By "positive pressure", it is meant a pressure exceeding the external (atmospheric) pressure.

In a preferred embodiment, the outlet orifice is arranged in the chamber wall such that the only restriction to flow of the food product around the outlet orifice is provided by the valve spindle. In this way, pressure variations around the outlet orifice can be minimised.

At least a lower half of the valve spindle may be completely exposed to the interior volume of the chamber when in the open position. In this way, the restriction on the flow of food product within the chamber can be minimised, particularly for viscous or semi-solid products.

The outlet orifice may be defined by a separate nozzle component which is installed in the chamber wall. The nozzle component may be formed of a hardened material having a precision-formed sealing surface, and may be installed with a screw thread so as to allow for repair or replacement.

The first sealing surface of the outlet orifice and the second sealing surface of the valve spindle may comprise conical surfaces arranged to make sealing contact with each other. Conical surfaces, or at least tapered surfaces, are preferred, because they enable the second sealing surface of the valve spindle to be guided into the appropriate mating position with the first sealing surface of the outlet orifice In embodiments, the apparatus may further comprise a spreader plate connected to the outlet orifice. The spreader plate connects the outlet orifice to a plurality of spreader plate outlets having a one or two dimensional arrangement. The apparatus may, for example, be used with a plurality of different spreader plates to provide respective different spreader plate outlet arrangements, thereby enabling the apparatus to be used in different manufacturing processes at different times.

Each of the spreader plate outlets may be provided with a pressure operated valve, the pressure operated valve being arranged to close when a pressure drops below a predetermined pressure greater than atmospheric pressure. In this way, positive operation of the apparatus can be maintained. The pressure operated valve could be a spring-loaded valve.

Preferably, the apparatus further comprises a linear actuator for driving the reciprocating movement of the valve spindle to thereby open and close the outlet orifice. The actuator may be coupled to a second end of the valve spindle, the second end being opposite to the first end. The actuator may be mounted to a wall of the chamber opposite to the wall in which the outlet orifice is arranged. The actuator may be mounted externally so as to improve accessibility for repair or replacement.

The actuator may be a moving coil electrical actuator or may comprise a pneumatic cylinder and pneumatic circuit for operating the cylinder.

The chamber may comprise parallel upper and lower plates defining upper and lower chamber walls arranged to face each other. In this case, the outlet orifice may be provided in the lower plate and the actuator may be mounted to the upper plate. One or both of the upper and lower plates may be removable from side walls of the chamber to enable the arrangement of the outlet orifices and/or actuators to be changed by replacing the plates.

Embodiments of the invention further comprise a controller for controlling operation of the actuator. The controller, which may comprise dedicated hardware or a computer running under the control of software, is arranged to control the actuator to open and close the outlet orifice for starting and stopping the deposition of the liquid, semi-liquid or semi-solid food product.

The controller may be arranged to control the actuator to open and close the outlet orifice in a cycle having a frequency of at least 2 Hz, preferably at least 5 Hz, and more preferably in the range 5 Hz to 10 Hz. The controller may be arranged to control the actuator to vary the proportion of the open/close cycle time in which the outlet orifice is open, to thereby varying the dispensing rate of the liquid, semi-liquid or semi-solid food product.

In a particular embodiment, the apparatus also comprises a pressure sensor for sensing the pressure of the liquid, semi-liquid or semi-solid food product in the chamber, and the controller is arranged to control the actuator based on the sensed pressure. In particular, the controller is arranged to use the sensed pressure to determine the amount of time for which the outlet orifice is to remain open.

The apparatus may further comprise a pump for supplying the liquid, semi-liquid or semi-solid food product to the chamber at a pressure in the range 5 bars to 12 bars.

A preferred embodiment of the invention comprises a plurality of outlet orifices arranged in the chamber wall for depositing the liquid, semi-liquid or semi-solid food product. The apparatus then comprises respective valve spindles and actuators for the outlet orifices, and the controller is arranged to control operation of all of the actuators. Such an embodiment is particularly advantageous because the pressure of the food product at the outlet orifices can be maintained at substantially the same level.

The outlet orifices may, for example, be provided in the same chamber wall and face in the same direction so that the valve spindles are parallel to one another.

Preferably, the space between the valve spindles is a part of the interior volume of the chamber, and is not provided with baffles. In some cases, some internal baffles (with connecting openings) may be necessary for transferring heat to the food product to maintain it in a liquid or semi-liquid state.

The invention also provides an arrangement for producing a food product, the apparatus comprising:
 a support arranged to carry the food product; and
 the apparatus described above, arranged over the support for depositing the liquid, semi-liquid or semi-solid food product onto the surface.

In a preferred arrangement, the apparatus can be moved across the support, for example on a carriage, to deposit the food product over a greater area. The support may be a mould. The movement of the apparatus over the support is preferably controlled by the controller.

The controller may be arranged to move the apparatus over the support such that the formation of "tails" is avoided when an outlet orifice is closed. For example, tailing can be avoided by a reverse motion of the apparatus at the end of a deposit stroke. Tailing may also be controlled by providing an arrangement whereby the apparatus can be moved upwards (away from) and/or downwards (towards) the support at the end of a deposit stroke.

The apparatus may, for example, be used in an intermittent motion food product moulding line, with the food product being deposited while the line (and mould) is stationary.

According to another aspect of the invention, there is provided a method of depositing a liquid, semi-liquid or semi-solid food product, the method comprising:
 providing the food product to a fixed volume chamber under a positive pressure, the chamber being defined by chamber walls, one of the chamber walls being provided with an outlet orifice for depositing the food product, the outlet orifice being provided with a first sealing surface; and
 providing a valve spindle within the chamber arranged for reciprocating movement, the length direction of the valve spindle extending substantially perpendicular to the chamber wall in which the outlet orifice is provided, a first end of the valve spindle being provided with a second sealing surface;
 reciprocating the valve spindle such that the second sealing surface of the valve spindle intermittently abuts the first sealing surface of the outlet orifice to thereby open and close the outlet orifice.

The method aspect of the invention corresponds to use of the apparatus described above.

BRIEF DESCRIPTION OF THE DRAWINGS

A specific embodiment of the invention will now be described, by way of example only, with reference to the accompanying drawings, in which.

DETAILED DESCRIPTION

The invention provides an apparatus for depositing a liquid, semi-liquid or semi-solid food product. The apparatus comprises a fixed volume chamber for receiving the food product under a positive pressure, the chamber being defined by chamber walls, one of the chamber walls being provided with an outlet orifice for depositing the food product, the outlet orifice being provided with a first sealing surface. The apparatus also comprises a valve spindle arranged for reciprocating movement within the chamber, the length direction of the valve spindle extending substantially perpendicular to the chamber wall in which the outlet orifice is provided, a first end of the valve spindle being provided with a second sealing surface. The second sealing surface of the valve spindle is arranged for abutting the first sealing surface of the outlet orifice to thereby close the outlet orifice.

Figure 1:
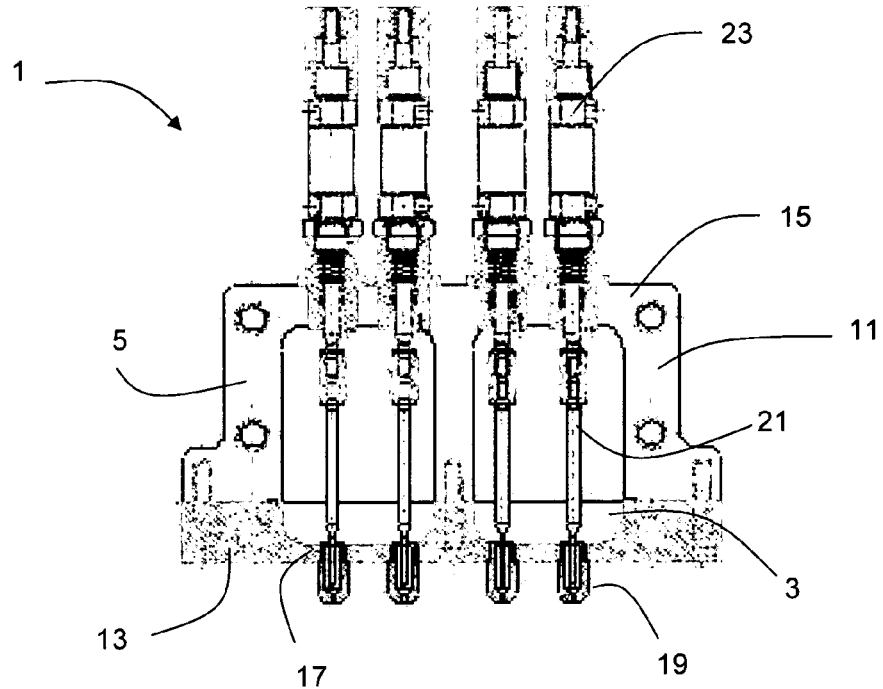
FIG. 1 is a schematic cross sectional view of an apparatus according to the invention.
Figure 2:
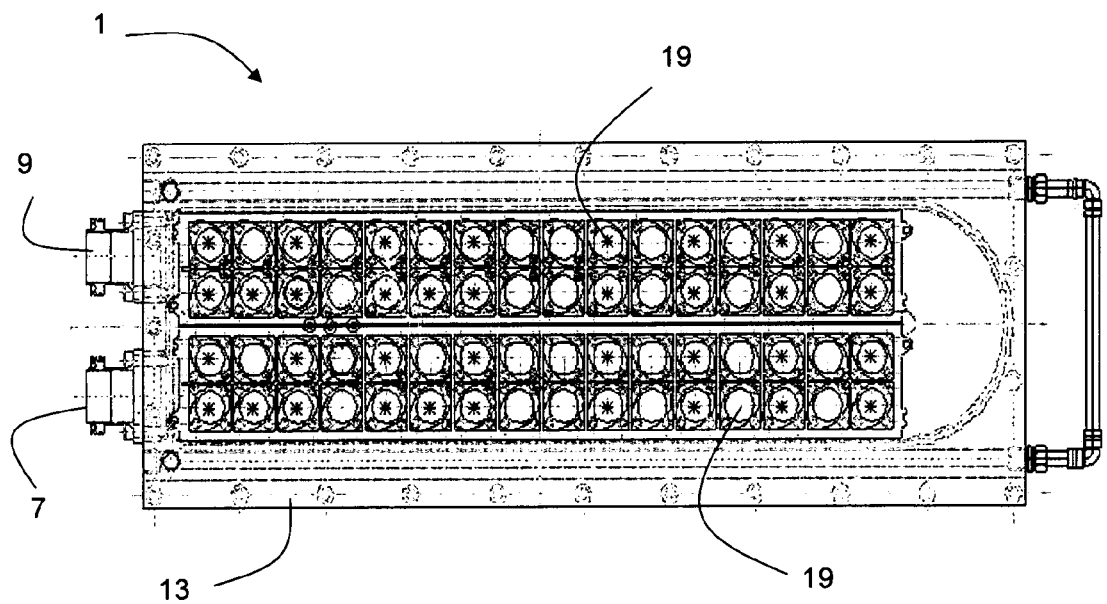
FIG. 2 is a plan view of the apparatus shown in FIG. 1.

With reference to FIGS. 1 and 2, an apparatus 1 for depositing a liquid, semi-liquid or semi-solid food product 3 comprises a fixed volume chamber 5 for receiving the food product 3 under a positive pressure of approximately 8 bars. The chamber 5 is provided with an inlet 7 and an outlet 9 for supplying the food product 3 to the chamber 5 from a pump (not shown). Suitable pumps and supply lines will be apparent to those skilled in the art. The pump is capable of supplying the food product 3 to the chamber at a rate of approximately 125% of the intended depositing rate.

Side walls 11 of the chamber 5 are provided as a unitary body formed of a stainless steel casting. Bottom and top walls of the chamber, which are substantially flat, are formed of stainless steel plates 13, 15 bolted and sealed to the side walls 11.

The bottom wall 13 of the chamber 5 is provided with a plurality of apertures 17 having a two dimensional arrangement for producing a desired depositing pattern (see FIG. 2). In the embodiment shown, the two dimensional arrangement of apertures 17 is a regular row and column array of 64 apertures. Other arrangements are, however, possible. A nozzle component 19 is screw-fitted into each of the apertures 17 and defines an outlet orifice through which the food product 3 is deposited. Diameters in the range 1.7 mm to 2.0 mm have been found to be suitable for the outlet orifices. An inside surface of the nozzle component 19 is provided with a conical surface formed around the outlet orifice, which surface serves as a first sealing surface.

The apparatus also comprises a plurality of valve spindles 21 associated with respective outlet orifices and a plurality of linear pneumatic actuators 23 associated with respective valve spindles 21.

Each valve spindle 21 is in the form of an elongate circular rod, or needle. A first (lower) end of the spindle 21 is provided with a conical surface which serves as a second sealing surface and is adapted for making sealing contact with the first sealing surface of a respective nozzle component 19, as described above. The valve spindle 21 has a length which is slightly less than the internal height of the chamber 5 (measured across the inner surfaces of the bottom and top plates 13, of the chamber 5). A second (upper) end of the valve spindle 21 is attached to a respective actuator 23, which is itself attached to the top plate 15 of the chamber 5. The actuator 23 is attached to the top plate 15 of the chamber 5 such that it can be accessed for repair or replacement without significant disassembly of the apparatus 1.

The actuators 23 and valve spindles 21 are arranged with their axes perpendicular to the bottom and top plates 13, 15 such that the actuators 23 can be operated to longitudinally displace the valve spindles 21 relative to the chamber walls with reciprocating movement. The valve spindles 21 are arranged such that, with the valve spindles 21 in their upper position, the outlet orifices are open so the food product 3 is deposited. With the valve spindles 21 in their lower position, the sealing surfaces of the nozzle components 19 and the valve spindles 21 are in sealing contact to thereby close the outlet orifices and prevent the flow of the food product 3.

The actuators 23 can be operated independently so that the flow of food product 3 can be varied between different outlet orifices, with a selectable number of the outlet orifices being open at any one time.

The actuators 23 are each connected to a pneumatic circuit (not shown) for providing linear movement and a controller (not shown) for controlling the pneumatic circuits. Suitable pneumatic circuits will be known to those skilled in the art. Suitable controllers include programmable logic controllers (PLCs) and suitably programmed computers.

In use of the apparatus 1, the controller is arranged to control the actuators 23 to independently open and close the respective outlet orifices for starting and stopping the deposition of the food product 3. The flow rate of the food product 3 through the outlet orifices can be controlled by opening and closing the outlet orifices in a cycle having a frequency of at least 2 Hz, and by varying the proportion of the cycle time in which the outlet orifice is open (i.e. varying the mark-space ratio).

The flow rate of the food product 3 through the outlet orifices also depends on the pressure of the food product 3 in the chamber 5. The controller is therefore provided with the output from a pressure sensor (not shown) which measures the pressure in the chamber 5. The controller controls the actuators 23 based on the sensed pressure.

A specific example of the invention has been described above. Various changes within the scope of the claims will be readily apparent to those skilled in the art.

For example, the actuators described above are pneumatic actuators. However, the actuators may alternatively be other types of actuator, such as moving coil electrical actuators. Moving coil electrical actuators may be capable of accurate positional control so that the flow rate of the food product through the outlet orifices can be varied by adjusting the linear position of the valve spindles.

The apparatus may be provided with a spreader plate attached to the bottom plate. The spreader plate connects the outlet orifices to a larger plurality of spreader plate outlets. The spreader plate outlets may be provided with a pressure operated valve, the pressure operated valve being arranged to close when a pressure drops below a predetermined pressure greater than atmospheric pressure.

The apparatus may be arranged in an intermittent motion (indexed) food product moulding line. When the line is stationary, the apparatus may be moved over a mould cavity at high speed to fill the mould cavity with the food product.

The invention claimed is:

1. An apparatus for depositing a food product comprising:
   a fixed volume chamber configured to receive the food product under a positive pressure, the chamber being defined by chamber walls, one of the chamber walls having outlet orifices for depositing the food product, each of the outlet orifices having a first sealing surface;
   valve spindles arranged for reciprocating movement within a respective chamber, a length direction of each valve spindle extending substantially perpendicular to the chamber wall in which the outlet orifices are provided, a first end of each valve spindle comprising a second sealing surface;
   linear actuators perpendicular to the respective chamber wall that has the outlet orifices, each of the linear actuators are associated with a respective valve spindle and a respective outlet orifice, the second sealing surface of each valve spindle abutting the first sealing surface of the respective outlet orifice to close the respective outlet orifice; and
   a controller configured to operate the linear actuators independently relative to each other, wherein the actuators are configured to be operated independently relative each other, so that a flow of the food product through the outlet orifices varies between different outlet orifices.

2. The apparatus according to claim 1, the outlet orifices being arranged in the respective chamber wall such that the only restriction to flow of the food product around the outlet orifices is provided by the valve spindles.

3. The apparatus according to claim 1, wherein at least a lower half of at least one of the valve spindles is completely exposed to an interior volume of the chamber when in an open position, minimizing a restriction on a flow of food product within the chamber.

4. The apparatus according to claim 1, wherein the outlet orifices are each defined by a separate nozzle component installed in the chamber wall.

5. The apparatus according to claim 1, wherein the first sealing surface of each of the outlet orifices and the second sealing surface of each valve spindle comprises a conical surface that is positioned to make sealing contact with each other.

6. The apparatus according to claim 1, comprising a spreader plate connected to the outlet orifices, the spreader plate connects the outlet orifices to spreader plate outlets having a one or two dimensional arrangement.

7. The apparatus according to claim 6, wherein each of the spreader plate outlets comprises a pressure operated valve that is designed to close when a pressure drops below a predetermined pressure greater than atmospheric pressure.

8. The apparatus according to claim 7, wherein the pressure operated valve comprises a spring-loaded valve.

9. The apparatus according to claim 1, wherein each actuator is configured to cause the reciprocating movement of the respective valve spindle to thereby open and close the respective outlet orifice.

10. The apparatus according to claim 9, wherein each actuator is coupled to a second end of the respective valve spindle, the second end being opposite to the first end.

11. The apparatus according to claim 9, wherein each actuator comprises a pneumatic cylinder.

12. The apparatus according to claim 9, wherein each actuator comprises a moving coil electrical actuator.

13. The apparatus according to claim 9, wherein the chamber comprises parallel upper and lower plates defining upper and lower chamber walls arranged to face each other, and the outlet orifices are located in the lower plate.

14. The apparatus according to claim 13, wherein one or both of the upper and lower plates is removable from side walls of the chamber.

15. The apparatus according to claim 1, wherein the controller is configured to control the actuators to independently open and close the outlet orifices for starting and stopping a deposition of the food product.

16. The apparatus according to claim 1, wherein the controller is designed to control the actuators to open and close the outlet orifices in a cycle having a frequency of at least 2 Hz.

17. The apparatus according to claim 16, wherein the controller is designed to control the actuators to vary a proportion of the cycle time in which the outlet orifices are open, for varying a dispensing rate of the food product.

18. The apparatus according to claim 1, further comprising a pressure sensor for sensing a pressure of the food product in the chamber, the controller designed to control the actuators based on a sensed pressure.

19. The apparatus according to claim 1, comprising a pump configured to supply the food product to the chamber at a pressure in the range 5 bars to 12 bars.

20. The apparatus according to claim 1, wherein the outlet orifices are designed such that, in use of the apparatus, a pressure of the food product is substantially the same at all of the outlet orifices.

21. The apparatus according to claim 1, wherein the outlet orifices are located in the same chamber wall, and the valve spindles are parallel to one another.

22. The apparatus according to claim 1, wherein the space between the valve spindles is a part of an interior volume of the chamber.

23. An arrangement for producing a food product comprising:
a support designed to carry the food product;
an apparatus configured to deposit a food product, the apparatus comprising: a fixed volume chamber configured to receive the food product under a positive pressure, the chamber being defined by chamber walls, one of the chamber walls having outlet orifices for depositing the food product, each of the outlet orifices having a first sealing surface, the apparatus comprising valve spindles arranged for reciprocating movement within the chamber, a length direction of each valve spindle extending substantially perpendicular to the chamber wall in which the outlet orifices are provided, a first end of each valve spindle comprising a second sealing surface, and the apparatus comprising linear actuators perpendicular to the chamber wall that has the outlet orifice, each of the linear actuators associated with a respective valve spindle and a respective outlet orifice, the second sealing surface of each valve spindle abutting the first sealing surface of the respective outlet orifice to close the respective outlet orifice, the apparatus positioned over the support for depositing the food product onto the support; and
a controller configured to operate the linear actuators independently relative to each other, wherein the actuators are configured to be operated independently relative each other, so that a flow of the food product through the outlet orifices varies between different outlet orifices.

24. The arrangement according to claim 23, wherein the support is a mold.

25. The arrangement according to claim 23, wherein the apparatus is designed to move across the support.

* * * * *